United States Patent [19]
Campbell et al.

[11] 3,844,953
[45] Oct. 29, 1974

[54] SOLID FILM LUBRICANT WITH POLYAMIDE BINDER

[75] Inventors: Mahlon E. Campbell, Overland Park, Kans.; William D. Walker, Kansas City, Mo.

[73] Assignee: Midwest Research Institute, Kansas City, Mo.

[22] Filed: Apr. 19, 1971

[21] Appl. No.: 135,429

[52] U.S. Cl. .................................................. 252/12
[51] Int. Cl. ............................................. C10m 7/34
[58] Field of Search ............. 252/25, 12, 12.2, 12.4, 252/12.6

[56] References Cited
UNITED STATES PATENTS

| | | | |
|---|---|---|---|
| 2,700,623 | 1/1955 | Hall | 252/25 |
| 2,703,768 | 3/1955 | Hall | 252/25 |
| 3,215,629 | 11/1965 | Weber et al. | 252/25 |
| 3,223,626 | 12/1965 | Murphy et al. | 252/25 |
| 3,288,710 | 11/1966 | Hollitz | 252/25 |
| 3,300,667 | 1/1967 | Boes et al. | 252/25 |
| 3,414,543 | 12/1968 | Paufler | 260/47 |
| 3,437,592 | 4/1969 | Boes et al. | 252/25 |
| 3,464,854 | 9/1969 | Bolger | 252/25 |
| 3,496,003 | 2/1970 | Simon-Vermot | 252/25 |
| 3,518,232 | 6/1970 | Bell | 260/47 |
| 3,525,691 | 8/1970 | McConnell | 252/25 |
| 3,575,858 | 4/1971 | Adair et al. | 252/25 |

*Primary Examiner*—Daniel E. Wyman
*Assistant Examiner*—I. Vaughn
*Attorney, Agent, or Firm*—D. A. N. Chase

[57] ABSTRACT

A solid film lubricant comprising a polyamide resin binder which contains residual ester and amino groups and has solid inorganic lubricants dispersed therein. The resin is made by reacting esters of aromatic tetracarboxylic acid dianhydrides with aromatic tetraamines.

12 Claims, No Drawings

SOLID FILM LUBRICANT WITH POLYAMIDE BINDER

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to improvements in organic bonded solid film lubricants.

Organic bonded solid film lubricants with useful wear-lives in high temperature applications have previously been developed, but normally the curing of the organic binder must be accomplished at an elevated temperature on the order of 500° F. or higher. Therefore, the applications for such lubricants are inherently limited to those substrates which are unaffected by the relatively high curing temperatures. Aluminum, for example, undergoes a significant loss in tensile strength if subjected to temperatures above 300° F. for even relatively short periods of approximately an hour. Accordingly, it may be appreciated that proper selection and formulation of solid film lubricants for a substrate of this type is a problem in applications where liquid lubricants are not desired, regardless of whether organic or inorganic substances are to be employed as the solid lubricant binder.

Therefore, the primary object of this invention is to provide a solid film lubricant which is useful over a wide range of temperatures including both relatively low and high temperature applications, and wherein the curing temperature of the binder is sufficiently low to permit the lubricant to be utilized on a great variety of substrates.

As a corollary to the foregoing object, it is an important aim of this invention to provide an organic bonded solid film lubricant having a useful wear-life at 800° to 900° F. in air and somewhat higher in a vacuum environment, wherein the lubricant is also useful in low temperature applications and may be cured at temperatures on the order of 200° to 300° F.

Another important object is to provide an organic bonded solid film lubricant in which the binder thereof exists as an intermediate stage polymer prior to actual application to a substrate, wherein the intermediate stage polymer is in the form of a powder that may be readily handled and stored, and that is readily soluble in common solvents for formulation into a liquid coating composition prior to application to the substrate.

Still another important object of this invention is to provide an organic solid film lubricant as aforesaid having a reduced friction coefficient and lower wear rates than other organic films.

Additionally, it is an important object of the present invention to provide an organic bonded solid film lubricant wherein the thickness of the film applied to a substrate may be readily controlled.

In general, the principle involved in the use of solid film lubricants is to interpose a lubricating film between mating bearing surfaces by bonding the film to one or more of the mating surfaces. Such films are oftentimes employed with bearings that are intended for operation under hostile environments for extended periods of time. Examples of common applications include bearings in equipment such as jet aircraft, space vehicles, furnaces, fabric handling equipment, hand appliances, and toys. Additionally, solid films enjoy use in gear applications where the presence of oils or liquids might be objectionable.

In the present invention, an organic, polymeric binder is utilized in the solid film lubricant, and comprises the product of an aromatic tetraamine with an ester derivative of an aromatic tetracarboxylic acid dianhydride. After the lubricant in liquid form is applied to the substrate, the binder is cured to advance the state of polymerization until it becomes thermoset. By limiting the curing temperature and time it has been found that the wear-life of the film is enhanced. Furthermore, the lower curing temperatures thus preferred make it possible to utilize the film of the present invention on a greater variety of substrates. As will be discussed hereinafter, it is believed that the final state of polymerization is insufficient to fully cyclize the polymeric binder to a polyimidazopyrrolone ("pyrrone") structure, and that ester groups are thus retained as a part thereof.

The basic polymer used for the binder, without esterification, is described fully in U.S. Pat. Nos. 3,414,543 and 3,518,232, the disclosures of such patents being incorporated herein by reference as may be required for a full and complete understanding of the polymeric structure and the method of preparation of polymers of this type. In order to form the ester derivative, the dianhydride is first reacted with an alcohol, the ester derivative thus obtained then being reacted with the tetraamine as discussed in the above identified patents. The initial reaction to obtain the ester derivative of the dianhydride is accomplished by dissolving the selected dianhydride in the alcohol with the application of sufficient heat to raise the temperature of the alcohol to approximately its boiling point, to increase the speed at which the dianhydride goes into solution.

Specifically, the reaction of an ester derivative of an aromatic tetracarboxylic acid dianhydride with an aromatic tetraamine is in accordance with the following equation:

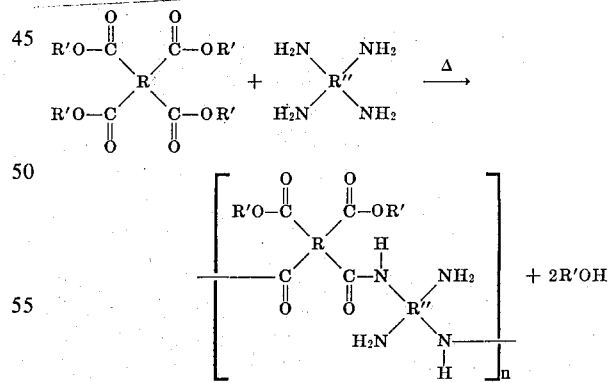

where R is a tetravalent aromatic radical, R' is an alkyl or aryl radical, R'' is a tetravalent aromatic radical, and $n$ is a relatively large number. As discussed in U.S. Pat. No. 3,414,543, the reactants are mixed in an organic solvent for at least one of the reactants (the solvent being inert to the reactants) for a time and at a temperature generally below 100° C. sufficient to provide the corresponding polyamide acid, which in the present invention has residual ester groups as well as residual amino groups. In this intermediate stage, the polymer is thermoplastic and is soluble in ether solvents such as dioxane or xylene. The intermediate stage polymer may be readily stored and handled since it is recoverable as a fine, free-flowing powder.

Representative dianhydrides that may be utilized as a starting material for forming the intermediate stage polymer include the following:

pyromellitic dianhydride
3,3',4,4'-benzophenone tetracarboxylic dianhydride
3,3',4,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl) propane dianhydride
bis(3,4-dicarboxyphenyl) sulfone dianhydride
3,4,9,10-perylene tetracarboxylic dianhydride
bis(3,4-dicarboxyphenyl) ether dianhydride
phenanthrene-1,8,9,10-tetracarboxylic dianhydride
pyrazine-2,3,5,6-tetracarboxylic dianhydride
2,2-bis(2,3-dicarboxyphenyl) propane dianhydride
1,1-bis(2,3-dicarboxyphenyl) ethane dianhydride
1,1-bis(3,4-dicarboxyphenyl) ethane dianhydride
bis(2,3-dicarboxyphenyl) methane dianhydride
bis(3,4-dicarboxyphenyl) methane dianhydride
benzene-1,2,3,4-tetracarboxylic dianhydride
thiophene-2,3,4,5-tetracarboxylic dianhydride Examples of tetra-amino compounds are:

3,3',4,4'-tetraaminobiphenyl
bis(3,4-diamino phenyl) methane
1,2-bis(3,4-diamino phenyl) ethane
2,2-bis(3,4-diamino phenyl) propane
bis(3,4-diamino phenyl) ether
bis-(3,4-diamino phenyl) sulfide
bis(3,4-diamino phenyl) sulfone
3,4,3',4'-tetra-amino diphenyl
1,2,4,5-tetra-amino benzene
2,3,6,7-tetra-amino naphthalene
3,3'4,4'-tetraaminobenzophenone To formulate the lubricant material of the present invention, a liquid coating composition is prepared by admixing a solution of the intermediate stage polymer and a finely divided, solid phase lubricating material. As discussed above, the solution form of the intermediate stage is readily obtained since the polymer is readily soluble in ether solvents. The lubricating material may comprise any of a number of powdered lubricating pigments such as molybdenum disulfide (MoS$_2$), molybdenum disulfide and antimony trioxide (Sb$_2$O$_3$), graphite, or soft metal powders. The selected lubricating pigment is blended with the polymeric binder solution until the pigment is dispersed throughout the liquid coating composition. The ratio by weight of lubricating pigment to polymeric binder is at least approximately 2:1. However, pigment to binder ratios in excess of about 10:1 tend to exhibit reduced wear-lives and thus would not normally be selected.

A preferred formulation will now be set forth in detail. The tetraamine is 3,3',4,4'-tetraaminobiphenyl and the ester derivative is the product of the reaction of ethanol with 3,3',4,4'-benzophenone tetracarboxylic dianhydride. Although ethanol is the preferred alcohol, other alcohols may be employed with equivalent results. Accordingly, the reaction to obtain the intermediate stage polymer is represented by the following:

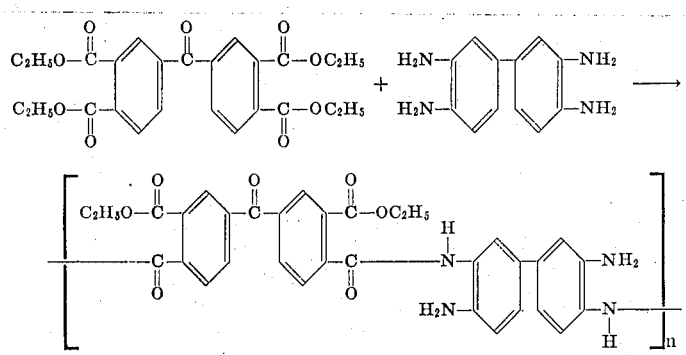

where $n$ is a relatively large number.

Since the intermediate stage polymer is readily soluble as discussed above, the liquid form thereof may be prepared with an 18 percent by weight solution of the polymer in dioxane. MoS$_2$ is the preferred lubricating material, and Sb$_2$O$_3$ is also selected since it enhances the wear-life of the lubricant as is revealed in test results to follow. MoS$_2$ (micro size) and Sb$_2$O$_3$ (chemically pure 200 mesh powder) are poured in the desired quantities, added to the liquid coating composition, and then the total ingredients are mixed with a high speed food blender for approximately 5 to 10 minutes. Prior to mixing, it is preferred that a small quantity of a leveling agent (such as Modaflow manufactured by Monsanto Chemical Company) be added in the proportion of 1 drop to each gram of polymeric binder. This results in a much denser, more uniform film when the completely admixed composition is applied to the substrate. Actual application to the substrate may be accomplished by either spraying or brushing, or the substrate may be dipped in the liquid coating composition. The thickness of the applied film is preferably approximately 0.0005 inch. (Thicknesses less than about 0.0001 inch are insufficient to prevent interference by the surface roughness of the substrate, while thicknesses greater than about 0.0006 inch tend to cause flaking of the lubricant.)

Following application, the film is first air dried for about 10 minutes and is then cured by baking the coated substrate in an air circulating oven at a temperature of 200°to 300° F. for a time period of no greater than approximately 2 hours. This causes evaporation of the solvent and advances the state of polymerization sufficiently to thermoset the resin.

Various tests were conducted to determine the optimum lubricating pigment to binder ratio, the optimum range of curing time and temperature, and the optimum ratio of $MoS_2$ to $Sb_2O_3$. These tests were conducted on a Falex tester in air at room temperature in order to determine the effect of formulation changes on wear-life. The data set forth hereinafter were collected with a standard Falex tester employing two V-block jaws loaded against a rotating pin having a diameter of one-fourth inch. Both the pin and the V-blocks were coated with the solid lubricant film to present coated bearing components. The pin material is AISI 3135 Steel $R_b$ 87-90 and the V-block material is AISI 1137 Steel $R_c$ 20-24. All wear-life tests were run at a speed of 290 rpm with a load of 1,000 lb. JAW.

Table I shows the wear-lives of three different lubricant formulations identified MLR-20, MLR-21, and MLR-22. In each of these formulations the lubricating pigments are different as specified in Table I. For the MLR-20 and MLR-21 lubricants, the lubricating pigment to binder ratio (L/B) was varied as indicated. One L/B ratio (1 to 0.27) was tested for MLR-22. These ratios are by weight, and the results are an average of five tests conducted at each condition. It may be noted from Table I that in all instances the optimum lubricant pigment to binder ratio is approximately 4:1. The curing time was one hour for each film tested.

Table II shows the test results that led to the particular selection of the preferred lubricating pigments utilized in the MLR-20 film. Again, five tests were run at each condition, and in all instances the lubricant pigment to binder ratio was maintained at the optimum ratio of 1:0.27, or approximately 4:1. Table II clearly reveals that the 3:1 ratio by weight of $MoS_2$ to $Sb_2O_3$ is optimum due to the greatly increased average wear-life, and that a ratio by weight of $MoS_2$ to $Sb_2O_3$ of at least approximately 7:3 provides a useful increase in wear-life over $MoS_2$ alone. The curing time was one hour for each film tested.

Table III shows the effect of curing temperature and time on the average wear-life of the MLR-20 film. From the Table it can be seen that a usable film is formed at curing temperatures as low as 200° F. Furthermore, longer cure times at 300° F. are detrimental to the film. Accordingly, it is believed that the thermoset, final stage polymeric binder, when cured at temperatures of approximately 200° to 300° F. for a time period of no greater than approximately 2 hours, is not fully cyclized to a pyrrone structure, thus the polymer would retain ester groups in the structural repeat units of the polymer chain.

TABLE II

| Lubricant Pigments | Cure Temperature (°F) | Surface Preparation | Average Wear-Life (min.) |
|---|---|---|---|
| 50% $MoS_2$, 50% $Sb_2O_3$ | 300 | Dry grit blast | 73 |
| 60% $MoS_2$, 40% $Sb_2O_3$ | 300 | Dry grit blast | 105 |
| 70% $MoS_2$, 40% $Sb_2O_3$ | 300 | Dry grit blast | 192 |
| 75% $MoS_2$, 25% $Sb_2O_3$ | 300 | Dry grit blast | 520 |
| 80% $MoS_2$, 20% $Sb_2O_3$ | 300 | Dry grit blast | 325 |
| 85% $MoS_2$, 15% $Sb_2O_3$ | 300 | Dry grit blast | 319 |
| 90% $MoS_2$, 10% $Sb_2O_3$ | 300 | Dry grit blast | 364 |
| 100% $MoS_2$ | 300 | Dry grit blast | 175 |

TABLE III

| Lubricant Film | Cure Temperature (°F) | Surface Treatment | Average Wear-Life (min.) |
|---|---|---|---|
| MLR-20 (75% $MoS_2$, 25% $Sb_2O_3$) | 200 — 1 hr. | Dry hone | 194 |
| MLR-20 | 250 — 1 hr. | Dry hone | 196 |
| MLR-20 | 300 — 1 hr. | Dry hone | 520 |
| MLR-20 | 300 — 1.5 hr. | Dry hone | 287 |
| MLR-20 | 300 — 2 hr. | Dry hone | 365 |
| MLR-20 | 300 — 2.5 hr. | Dry hone | 34 |

TABLE I

| Lubricant Film | L/B Ratio | Cure Temperature (°F) | Surface Preparation | Average Wear-Life (min.) |
|---|---|---|---|---|
| MLR-20 (75% $MoS_2$, 25% $Sb_2O_3$) | 1:0.09 | 300°F | Dry Grit Blast | 172 |
| | 1:0.135 | 300°F | Dry Grit Blast | 180 |
| | 1:0.18 | 300°F | Dry Grit Blast | 221 |
| | 1:0.225 | 300°F | Dry Grit Blast | 275 |
| | 1:0.27 | 300°F | Dry Grit Blast | 523 |
| | 1:0.315 | 300°F | Dry Grit Blast | 373 |
| | 1:0.36 | 300°F | Dry Grit Blast | 254 |
| | 1:0.45 | 300°F | Dry Grit Blast | 185 |
| | 1:0.63 | 300°F | Dry Grit Blast | 21 |
| | 1:0.81 | 300°F | Dry Grit Blast | 23 |
| MLR-21 (90% $MoS_2$, 10% graphite) | 1:0.09 | 300°F | Dry Grit Blast | 167 |
| | 1:0.18 | 300°F | Dry Grit Blast | 150 |
| | 1:0.225 | 300°F | Dry Grit Blast | 232 |
| | 1:0.27 | 300°F | Dry Grit Blast | 285 |
| | 1:0.315 | 300°F | Dry Grit Blast | 187 |
| | 1:0.36 | 300°F | Dry Grit Blast | 71 |
| MLR-22 (70% $MoS_2$, 20% $Sb_2O_3$, 10% graphite) | 1:0.27 | 300°F | Dry Grit Blast | 224 |

Journal-bearing tests were also run using the MLR-20 and the MLR-21 films, the results being shown in Table IV. The pins were carbon steel five-eighths inch in diameter, and the spherical journal bearing was 52100 steel, lubricant being applied to the shaft and bearing bore. The shaft was run at a speed of 100 rpm and the applied load was 3,000 psi. As in the Falex tests, conditions were air at room temperature. It may be observed that superior results were obtained in this particular application through the use of a pigment comprising $MoS_2$ with the addition of some graphite (MLR-21) as would be expected in journal-bearing applications where a slightly soft film is preferred.

In the journal-bearing tests, several curing temperatures were employed including temperatures in the 200° to 300° F. range discussed above, and a curing temperature of 575° F. for 1 hour for both MLR-20 and MLR-21.

TABLE IV

Lubricant Material - MLR-20 (75% $MoS_2$, 25% $Sb_2O_3$ - L/B ratio 1:0.27)

| Curing Temperature (°F) | Coating Thickness (in.) Pin | Bushing | Wear-Life (min.) | Wear-Life (ft. of travel) |
|---|---|---|---|---|
| 200, 1 hr. | 0.0007 | 0.0005 | 620 | 10,125 |
| do. | 0.0004 | 0.001 | 659 | 10,760 |
| do. | 0.0004 | 0.0008 | 809 | 13,210 |
| 250, 1 hr. | 0.0008 | 0.0004 | 798 | 13,030 |
| do. | 0.0007 | 0.0008 | 780 | 12,737 |
| do. | 0.0004 | 0.002 | 721 | 11,774 |
| 300, 1 hr. | 0.0007 | 0.0011 | 909 | 14,844 |
| do. | 0.0004 | 0.0013 | 728 | 11,888 |
| do. | 0.0005 | 0.0014 | 734 | 11,986 |
| 575, 1 hr. | 0.0006 | 0.0004 | 325 | 5,307 |
| do. | 0.0006 | 0.0003 | 288 | 4,703 |
| do. | 0.0007 | 0.0004 | 352 | 5,748 |

Lubricant Material - MLR-21 (90% $MoS_2$, 10% Graphite — L/B ratio 1:0.27)

| Curing Temperature (°F) | Coating Thickness (in.) Pin | Bushing | Wear-Life (min.) | Wear-Life (ft. of travel) |
|---|---|---|---|---|
| 300, 1 hr. | 0.0004 | 0.0005 | 1,649 | 26,928 |
| do. | 0.0004 | 0.0004 | 1,802 | 29,427 |
| do. | 0.0003 | 0.0004 | 1,230 | 20,086 |
| 575, 1 hr. | 0.0004 | 0.0002 | 786 | 12,835 |
| do. | 0.0003 | 0.0003 | 984 | 16,070 |
| do. | 0.0007 | 0.0006 | 1,131 | 18,470 |

Table IV clearly reveals a significant loss of wear-life for both MLR-20 and MLR-21 when the films are cured at 575° F. rather than lower temperatures. All of the journal-bearing wear-life tests terminated at a coefficient of friction of 0.3 and all surfaces were dry honed prior to lubricant application.

Having thus described the invention, what is claimed as new and desired to be secured by Letters Patent is:

1. A solid film lubricant adhered to a bearing surface, said lubricant comprising a layer of a polymeric composition having a finely divided, inorganic, solid phase lubricating material dispersed throughout said composition, said composition being characterized by the property of having been derived from the reaction of an aromatic tetraamine with an ester derivative of an aromatic tetracarboxylic acid dianhydride, said lubricant being coated on said surface with said composition in a soluble state and then cured thereon by advancing said composition to a degree of polymerization no greater than that achieved by heat curing the composition at temperatures of approximately 200° to 300° F. for not more than about two hours, the ratio by weight of said lubricating material to said composition being from about 2:1 to about 10:1.

2. The lubricant as claimed in claim 1, wherein said layer has a thickness of approximately 0.0001 to 0.0006 inch.

3. The lubricant as claimed in claim 1, wherein said tetraamine is 3,3',4,4'-tetraaminobiphenyl and said ester derivative is the product of the reaction of an alcohol with 3,3',4,4'-benzophenone tetracarboxylic dianhydride.

4. The lubricant as claimed in claim 3, wherein said alcohol is ethanol.

5. The lubricant as claimed in claim 3, wherein the ratio by weight of said material to said composition is approximately 4:1.

6. The lubricant as claimed in claim 1, wherein said material comprises $MoS_2$ and $Sb_2O_3$ present in a ratio by weight of $MoS_2$ to $Sb_2O_3$ of at least approximately 7:3.

7. The lubricant as claimed in claim 1, wherein said material comprises $MoS_2$ and $Sb_2O_3$ present in a ratio by weight of $MoS_2$ to $Sb_2O_3$ of approximately 3:1.

8. The lubricant as claimed in claim 1, wherein said layer has a thickness of approximately 0.0001 to 0.0006 inch, and wherein said lubricating material is characterized by the property of being bonded to said surface by said composition after advancement to said degree of polymerization to present a lubricating film of said thickness capable of maintaining its integrity when subjected to a wear-producing load.

9. In a solid film lubricant where a binder is employed having a finely divided, inorganic, solid phase lubricating material dispersed throughout a layer of said binder adhered to a bearing surface, the improvement wherein said binder comprises a polymeric composition characterized by the property of having been derived from the reaction of an aromatic tetraamine with an ester derivative of an aromatic tetracarboxylic acid dianhydride, said lubricant being coated on said surface with said composition in a soluble state and then cured thereon by advancing said composition to a degree of polymerization no greater than that achieved by heat curing the composition at temperatures of approximately 200° to 300° F. for not more than about two hours, the ratio by weight of said lubricating material to said composition being from about 2:1 to about 10:1.

10. In the lubricant as claimed in claim 9, wherein said tetraamine is 3,3',4,4'-tetraaminobiphenyl and said ester derivative is the product of the reaction of an alcohol with 3,3',4,4'-benzophenone tetracarboxylic dianhydride.

11. A method of making a bearing which comprises the steps of:
   a. dissolving a thermoplastic powder made by reacting an aromatic tetraamine with an ester derivative of an aromatic tetracarboxylic acid dianhydride in an organic solvent to form a coating composition;
   b. mixing said coating composition with a finely divided, inorganic, solid phase lubricating material in such proportion that the weight ratio of the lubricating material to the resin in the final solid film lubricant will be from about 2:1 to about 10:1;
   c. applying the composition in (b) to a substrate surface; and
   d. curing the coated substrate surface of (c) by heating at a temperature of approximately 200° to 300° F. for not more than about two hours to convert the thermoplastic resin to a thermoset resin to form the final adhering solid film bearing surface.

12. The method as claimed in claim 11, wherein said tetraamine is 3,3',4,4'-tetraaminobiphenyl and said ester derivative is the product of the reaction of an alcohol with 3,3',4,4'-benzophenone tetracarboxylic dianhydride.

* * * * *